(12) United States Patent
Knopf

(10) Patent No.: US 12,015,666 B2
(45) Date of Patent: *Jun. 18, 2024

(54) SYSTEMS AND METHODS FOR DISTRIBUTING PARTIAL DATA TO SUBNETWORKS

(71) Applicant: Neustar, Inc., Reston, VA (US)

(72) Inventor: Brian R. Knopf, Woodland Hills, CA (US)

(73) Assignee: NEUSTAR, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,517

(22) Filed: Mar. 23, 2021

(65) Prior Publication Data
US 2022/0046088 A1 Feb. 10, 2022

Related U.S. Application Data

(63) Continuation of application No. 15/652,089, filed on Jul. 17, 2017, now Pat. No. 10,958,725, which is a (Continued)

(51) Int. Cl.
*H04L 67/1097* (2022.01)
*H04L 9/32* (2006.01)
(Continued)

(52) U.S. Cl.
CPC .......... *H04L 67/1095* (2013.01); *H04L 9/321* (2013.01); *H04L 9/3247* (2013.01);
(Continued)

(58) Field of Classification Search
CPC ............. H04L 67/1095; H04L 67/1097; H04L 41/0893; H04L 9/321; H04L 9/3247
See application file for complete search history.

(56) References Cited

U.S. PATENT DOCUMENTS 5,455,865 A 10/1995 Perlman
5,715,314 A 2/1998 Payne et al.
(Continued)

FOREIGN PATENT DOCUMENTS

EP 0683582 A1 11/1995
KR 20130083619 A 7/2013

OTHER PUBLICATIONS

Abe, Tsuyoshi et al., "Implementing Identity Provider on Mobile Phone," 2007, ACM, pp. 46-52.
(Continued)

*Primary Examiner* — Ali S Abyaneh
(74) *Attorney, Agent, or Firm* — Sterne, Kessler, Goldstein & Fox P.L.L.C.

(57) ABSTRACT

Computer systems and methods for replicating a portion of a data set to a local repository associated with a subnetwork are disclosed. In one implementation, a method for a device associated with a subnetwork may include obtaining a portion of a data set from a central repository. The data set may be associated with one or more subnetworks, and the portion of the data set may be associated with the subnetwork. The method may further include obtaining a request for data originating from a node in the subnetwork. In addition, the method may include determining whether the central repository is unavailable to provide the requested data, and providing the requested data to the node after the central repository is determined as being unavailable.

18 Claims, 5 Drawing Sheets

Related U.S. Application Data continuation of application No. 15/588,533, filed on May 5, 2017, now Pat. No. 10,404,472.

(60) Provisional application No. 62/469,346, filed on Mar. 9, 2017, provisional application No. 62/332,271, filed on May 5, 2016.

(51) Int. Cl.
 *H04L 67/1095* (2022.01)
 *H04L 41/0893* (2022.01)

(52) U.S. Cl.
 CPC ...... *H04L 67/1097* (2013.01); *H04L 41/0893* (2013.01); *H04L 2209/805* (2013.01)

(56) References Cited

U.S. PATENT DOCUMENTS

| | | | |
|---|---|---|---|
| 6,209,091 B1 | 3/2001 | Sudia et al. | |
| 6,263,446 B1 | 7/2001 | Kausik et al. | |
| 6,381,331 B1 | 4/2002 | Kato | |
| 6,801,534 B1 | 10/2004 | Arrowood et al. | |
| 6,826,690 B1 | 11/2004 | Hind et al. | |
| 6,850,951 B1 | 2/2005 | Davison | |
| 7,266,695 B2 * | 9/2007 | Nakayama | G06F 21/31 713/172 |
| 7,320,073 B2 | 1/2008 | Zissimopoulos et al. | |
| 7,428,750 B1 | 9/2008 | Dunn et al. | |
| 7,522,723 B1 | 4/2009 | Shaik | |
| 8,023,647 B2 | 9/2011 | Shaik | |
| 8,161,155 B2 | 4/2012 | Van Der Merwe et al. | |
| 8,229,484 B2 | 7/2012 | Anisimov | |
| 8,255,921 B2 * | 8/2012 | Arvidsson | G06F 9/545 718/100 |
| 8,561,187 B1 | 10/2013 | Hegil | |
| 8,578,468 B1 | 11/2013 | Yadav | |
| 8,726,379 B1 | 5/2014 | Stiansen | |
| 8,769,304 B2 | 7/2014 | Kirsch | |
| 8,817,786 B2 | 8/2014 | Kassi-Lahlou et al. | |
| 8,819,825 B2 | 8/2014 | Keromytis et al. | |
| 9,027,135 B1 | 5/2015 | Aziz | |
| 9,043,274 B1 * | 5/2015 | Cheng | H04L 43/106 707/613 |
| 9,094,811 B1 | 7/2015 | Rosen | |
| 9,177,005 B2 | 11/2015 | Mehta et al. | |
| 9,197,673 B1 * | 11/2015 | Gaddy | H04L 63/0428 |
| 9,203,819 B2 | 12/2015 | Fenton et al. | |
| 9,215,223 B2 | 12/2015 | Kirsch | |
| 9,344,413 B2 | 5/2016 | Kirsch | |
| 9,356,942 B1 | 5/2016 | Joffe | |
| 9,418,222 B1 | 8/2016 | Rivera et al. | |
| 9,430,646 B1 | 8/2016 | Mushtaq et al. | |
| 9,485,231 B1 | 11/2016 | Reese | |
| 9,521,240 B1 | 12/2016 | Rosen | |
| 9,674,222 B1 | 6/2017 | Joffe | |
| 9,762,458 B2 | 9/2017 | Kim et al. | |
| 9,819,556 B2 | 11/2017 | Kim et al. | |
| 9,832,217 B2 | 11/2017 | Berger et al. | |
| 10,158,539 B2 | 12/2018 | Kim et al. | |
| 10,231,268 B2 | 3/2019 | Pathuri et al. | |
| 10,244,107 B1 | 3/2019 | Sena | |
| 10,314,088 B2 | 6/2019 | Pathuri et al. | |
| 10,404,472 B2 | 9/2019 | Knopf | |
| 10,958,725 B2 | 3/2021 | Knopf | |
| 11,025,428 B2 | 6/2021 | Knopf | |
| 11,108,562 B2 | 8/2021 | Knopf | |
| 11,277,439 B2 | 3/2022 | Knopf | |
| 11,665,004 B2 | 5/2023 | Knopf | |
| 11,804,967 B2 | 10/2023 | Knopf | |
| 2001/0024502 A1 | 9/2001 | Ohkuma et al. | |
| 2002/0076055 A1 * | 6/2002 | Filipi-Martin | H04L 9/0894 380/282 |
| 2002/0194163 A1 | 12/2002 | Hopeman et al. | |
| 2003/0065947 A1 | 4/2003 | Song | |
| 2003/0074456 A1 * | 4/2003 | Yeung | H04L 9/40 709/219 |
| 2003/0110397 A1 * | 6/2003 | Supramaniam | G06F 21/6218 726/1 |
| 2003/0147534 A1 | 8/2003 | Ablay et al. | |
| 2003/0177400 A1 | 9/2003 | Raley et al. | |
| 2003/0195924 A1 * | 10/2003 | Franke | H04L 67/5683 709/203 |
| 2003/0204511 A1 | 10/2003 | Brundage et al. | |
| 2004/0062400 A1 | 4/2004 | Sovio et al. | |
| 2004/0088587 A1 | 5/2004 | Ramaswamy et al. | |
| 2004/0172557 A1 | 9/2004 | Nakae et al. | |
| 2004/0176123 A1 | 9/2004 | Chin et al. | |
| 2004/0205342 A1 | 10/2004 | Roegner | |
| 2005/0010447 A1 | 1/2005 | Miyasaka et al. | |
| 2005/0036616 A1 | 2/2005 | Huang et al. | |
| 2005/0044402 A1 | 2/2005 | Libin et al. | |
| 2005/0054380 A1 | 3/2005 | Michaelis | |
| 2005/0097320 A1 | 5/2005 | Golan et al. | |
| 2005/0132060 A1 | 6/2005 | Mo et al. | |
| 2005/0220080 A1 | 10/2005 | Ronkainen | |
| 2005/0220095 A1 | 10/2005 | Narayanan et al. | |
| 2006/0059551 A1 | 3/2006 | Borella | |
| 2006/0080534 A1 | 4/2006 | Yeap et al. | |
| 2006/0083187 A1 | 4/2006 | Dekel | |
| 2006/0090166 A1 | 4/2006 | Dhara et al. | |
| 2006/0101516 A1 | 5/2006 | Sudaharan | |
| 2006/0129817 A1 | 6/2006 | Borneman et al. | |
| 2006/0131385 A1 | 6/2006 | Kim | |
| 2006/0206709 A1 | 9/2006 | Labrou et al. | |
| 2006/0224508 A1 | 10/2006 | Fietz | |
| 2006/0236095 A1 | 10/2006 | Smith | |
| 2007/0061263 A1 | 3/2007 | Carter et al. | |
| 2007/0198437 A1 | 8/2007 | Eisner et al. | |
| 2007/0228148 A1 | 10/2007 | Rable | |
| 2008/0016232 A1 | 1/2008 | Yared et al. | |
| 2008/0028453 A1 | 1/2008 | Nguyen et al. | |
| 2008/0028463 A1 | 1/2008 | Dagon | |
| 2008/0046987 A1 | 2/2008 | Spector | |
| 2008/0089520 A1 | 4/2008 | Kessler | |
| 2008/0141313 A1 | 6/2008 | Kato et al. | |
| 2008/0163354 A1 | 7/2008 | Ben-Shalom et al. | |
| 2008/0189778 A1 | 8/2008 | Rowley | |
| 2008/0222711 A1 | 9/2008 | Michaelis | |
| 2008/0250248 A1 | 10/2008 | Lieber | |
| 2009/0037994 A1 | 2/2009 | Buss et al. | |
| 2009/0080408 A1 | 3/2009 | Natoli et al. | |
| 2009/0089625 A1 | 4/2009 | Kannappan et al. | |
| 2009/0097488 A1 | 4/2009 | Kassi-Lahlou et al. | |
| 2009/0119778 A1 | 5/2009 | Bhuyan | |
| 2009/0157799 A1 | 6/2009 | Sukumaran et al. | |
| 2009/0228577 A1 * | 9/2009 | Webb-Johnson | H04L 63/20 709/221 |
| 2009/0245176 A1 | 10/2009 | Balasubramanian et al. | |
| 2009/0249014 A1 | 10/2009 | Obereiner | |
| 2009/0249497 A1 | 10/2009 | Fitzgerald | |
| 2009/0260064 A1 | 10/2009 | McDowell | |
| 2010/0003959 A1 | 1/2010 | Coppage | |
| 2010/0077457 A1 | 3/2010 | Xu et al. | |
| 2010/0100945 A1 | 4/2010 | Ozzie et al. | |
| 2010/0100950 A1 | 4/2010 | Roberts | |
| 2010/0161969 A1 | 6/2010 | Grebovich et al. | |
| 2010/0162396 A1 | 6/2010 | Liu | |
| 2010/0174439 A1 | 7/2010 | Petricoin, Jr. et al. | |
| 2010/0182283 A1 | 7/2010 | Sip | |
| 2010/0185869 A1 | 7/2010 | Moore et al. | |
| 2010/0210240 A1 | 8/2010 | Mahaffey et al. | |
| 2010/0235919 A1 | 9/2010 | Adelstein et al. | |
| 2010/0260337 A1 | 10/2010 | Song et al. | |
| 2010/0275009 A1 | 10/2010 | Canard et al. | |
| 2010/0306107 A1 | 12/2010 | Nahari | |
| 2010/0316217 A1 | 12/2010 | Gammel et al. | |
| 2010/0325685 A1 | 12/2010 | Sanbower | |
| 2011/0009086 A1 | 1/2011 | Poremba et al. | |
| 2011/0067095 A1 | 3/2011 | Leicher et al. | |
| 2011/0078439 A1 | 3/2011 | Mao et al. | |
| 2011/0103393 A1 | 5/2011 | Meier et al. | |
| 2011/0126264 A1 * | 5/2011 | Dunstan | G06Q 20/02 726/3 |

(56) References Cited

U.S. PATENT DOCUMENTS

| | | |
|---|---|---|
| 2011/0167494 A1 | 7/2011 | Bowen et al. |
| 2011/0179475 A1 | 7/2011 | Foell et al. |
| 2011/0222466 A1 | 9/2011 | Pance |
| 2011/0246765 A1 | 10/2011 | Schibuk |
| 2011/0252459 A1* | 10/2011 | Walsh ............ H04L 9/3263 726/4 |
| 2011/0282997 A1* | 11/2011 | Prince ............ G06Q 30/0241 709/226 |
| 2012/0042381 A1 | 2/2012 | Antonakakis |
| 2012/0050455 A1* | 3/2012 | Santamaria ........ H04L 65/1089 348/E7.078 |
| 2012/0124379 A1 | 5/2012 | Teranishi |
| 2012/0155637 A1 | 6/2012 | Lambert et al. |
| 2012/0158725 A1 | 6/2012 | Molloy et al. |
| 2012/0197911 A1 | 8/2012 | Banka et al. |
| 2012/0233685 A1 | 9/2012 | Palanigounder et al. |
| 2012/0265631 A1 | 10/2012 | Cronic et al. |
| 2012/0320912 A1 | 12/2012 | Estrada |
| 2012/0324076 A1 | 12/2012 | Zerr et al. |
| 2012/0324242 A1 | 12/2012 | Kirsch |
| 2012/0331296 A1* | 12/2012 | Levin ............ H04W 4/70 370/328 |
| 2013/0133072 A1 | 5/2013 | Kraitsman et al. |
| 2013/0198078 A1 | 8/2013 | Kirsch |
| 2013/0198516 A1 | 8/2013 | Fenton et al. |
| 2013/0198598 A1 | 8/2013 | Kirsch |
| 2013/0198834 A1 | 8/2013 | Kirsch |
| 2013/0205136 A1 | 8/2013 | Kirsch |
| 2013/0239169 A1 | 9/2013 | Nakhjiri |
| 2013/0246272 A1 | 9/2013 | Kirsch |
| 2013/0246280 A1 | 9/2013 | Kirsch |
| 2014/0198791 A1 | 7/2014 | Lim |
| 2014/0214902 A1 | 7/2014 | Mehta et al. |
| 2014/0244818 A1* | 8/2014 | Taine ............ G06F 21/629 709/223 |
| 2014/0283061 A1 | 9/2014 | Quinlan et al. |
| 2014/0344904 A1* | 11/2014 | Venkataramani ........ G06F 21/35 726/5 |
| 2014/0351596 A1* | 11/2014 | Chan ............ H04L 63/0876 713/170 |
| 2015/0033024 A1 | 1/2015 | Mashima et al. |
| 2015/0047032 A1 | 2/2015 | Hannis et al. |
| 2015/0088754 A1 | 3/2015 | Kirsch |
| 2015/0321557 A1 | 11/2015 | Kim et al. |
| 2015/0326588 A1 | 11/2015 | Vissamsetty |
| 2016/0105344 A1 | 4/2016 | Kim et al. |
| 2016/0105345 A1 | 4/2016 | Kim et al. |
| 2016/0105359 A1 | 4/2016 | Kim et al. |
| 2016/0165651 A1 | 6/2016 | Pathuri et al. |
| 2016/0173505 A1 | 6/2016 | Ichihara |
| 2016/0197932 A1 | 7/2016 | Hoffman |
| 2016/0241509 A1 | 8/2016 | Akcin |
| 2016/0261413 A1 | 9/2016 | Kirsch |
| 2017/0079079 A1 | 3/2017 | Pathuri et al. |
| 2017/0324564 A1 | 11/2017 | Knopf |
| 2017/0339115 A1 | 11/2017 | Cho et al. |
| 2017/0359323 A1* | 12/2017 | Weis ............ H04L 9/083 |
| 2017/0366575 A1 | 12/2017 | Polepalli et al. |
| 2018/0013569 A1 | 1/2018 | Knopf |
| 2018/0013570 A1 | 1/2018 | Knopf |
| 2018/0013786 A1 | 1/2018 | Knopf |
| 2018/0013824 A1 | 1/2018 | Knopf |
| 2018/0103057 A1 | 4/2018 | St. Pierre |
| 2018/0167393 A1 | 6/2018 | Walrant |
| 2018/0183603 A1 | 6/2018 | Liu et al. |
| 2018/0229739 A1 | 8/2018 | Imamoto et al. |
| 2019/0124199 A1 | 4/2019 | Sena |
| 2022/0123946 A1 | 4/2022 | Knopf |
| 2022/0231859 A1 | 7/2022 | Knopf et al. |
| 2023/0035336 A1 | 2/2023 | Knopf |
| 2023/0362014 A1 | 11/2023 | Knopf |
| 2023/0388131 A1 | 11/2023 | Knopf |

OTHER PUBLICATIONS

Balasubramaniam, Sriram et al., "Identity Management and its Impact on Federation in a System-of-Systems Context," Mar. 23-26, 2009, IEEE, pp. 179-182.

Beasley, Jim et al., "Virtual Bluetooth Devices as a Means of Extending Pairing and Bonding in a Bluetooth Network," 2002, IEEE, vol. 4, pp. 2087-2089.

Chen, Liqun et al., Multiple Trusted Authorities in Identified Based Cryptography from Pairings on Elliptic Curves, Mar. 19, 2003, HP, pp. 1-26.

International Search Report and Written Opinion of PCT/US2012/042743 dated Sep. 18, 2012, 10 pages.

International Search Report and Written Opinion of PCT/US2013/022207 dated Mar. 29, 2013, 11 pages.

International Search Report and Written Opinion of PCT/US2017/31438 dated Jul. 25, 2017, 8 pages.

International Search Report and Written Opinion of PCT/US2018/21877 dated May 30, 2018, 8 pages.

International Search Report and Written Opinion of PCT/US2018/42524 dated Oct. 30, 2018, 8 pages.

International Search Report and Written Opinion of PCT/US2018/42508 dated Dec. 13, 2018, 8 pages.

Jansen, Wayne et al., "Guidelines on Cell Phone and PDA Security," Oct. 2008, NIST, pp. 1-52.

Kholmatov, Alisher et al., "Identity Authentication Using Improved Online Signature Verification Method," Nov. 2005, ScienceDirect, vol. 26, Issue 15, pp. 2400-2408.

Masmoudi, Khaled et al., "Building Identity-Based Security Associations for Provider—Provisioned Virtual Private Networks," Dec. 2008, Springer, vol. 39, Issue 3, pp. 215-222.

Mayrhofer, Rene et al., "Shake Well Before Use: Intuitive and Secure Pairing of Mobile Devices," Feb. 27, 2009, IEEE, vol. 8, Issue 6, pp. 792-806.

Nguyen, Lan et al., "Secure Authorization, Access Control and Data Integrity in Bluetooth," 2002, IEEE, pp. 428-433.

Novotny, Jason et al., "An Online Credential Repository for the Grid: MyProxy," 2001, IEEE, pp. 104-111.

Poggi, Nicolas et al., "Automatic Detection and Banning of Content Stealing Bots for E-Commerce, " NIPS 2007 Workshop on Machine Learning in Adversarial Environments for Computer Security, 2 pages, Dec. 8, 2007.

So-In, Chakchai et al., "Virtual ID: A Technique for Mobility, MultiHoming, and Location Privacy in Next Generation Wireless Networks," Jan. 9-12, 2010, IEEE, pp. 1-5.

Squicciarini, Anna Cinzia et al., "Access Control Strategies for Virtualized Environments in Grid Computing Systems, " Mar. 21-23, 2007, IEEE, pp. 48-54.

Tangswongsan, Supachai et al., "A Model of Network Security with Prevention Capability by Using Decoy Technique," World Academy of Science, Engineering and Technology 29, pp. 184-189, 2007.

Heer, Tobias, et al., "ALPHA: an adaptive and lightweight protocol for hop-by-hop authentication." Proceedings of the 2008 ACM CoNEXT Conference. ACM, 2008.

Lu, Bin, and Udo W. Pooch, "A lightweight authentication protocol for mobile ad hoc networks," International Conference on Information Technology: Coding and Computing (ITCC'05)-vol. II, vol. 2, IEEE, 2005.

Sanzgiri, Kimaya, et al., "A secure routing protocol for ad hoc networks," 10$^{th}$ IEEE International Conference on Network Protocols, 2002, Proceedings, IEEE, 2002.

Request for Comments: 7159. The JavaScript Object Notation (JSON) Data Interchange Format, Mar. 2014.

* cited by examiner

SYSTEMS AND METHODS FOR DISTRIBUTING PARTIAL DATA TO SUBNETWORKS

CROSS-REFERENCE TO RELATED APPLICATION(S)

This application is a continuation of U.S. application Ser. No. 15/652,089, filed on Jul. 17, 2017, titled "SYSTEMS AND METHODS FOR DISTRIBUTING PARTIAL DATA TO SUBNETWORKS," which is a continuation-in-part of U.S. application Ser. No. 15/588,533, filed on May 5, 2017, titled "SYSTEMS AND METHODS FOR ENABLING TRUSTED COMMUNICATIONS BETWEEN ENTITIES," which claims priority to U.S. Provisional Application No. 62/332,271, filed on May 5, 2016, titled "DEVICE AUTHENTICATION USING A CENTRAL REPOSITORY." This application also claims priority to U.S. Provisional Application No. 62/469,346, filed on Mar. 9, 2017, titled "METHODS AND SYSTEMS FOR IDENTITY MANAGEMENT." Further, this application is related to U.S. application Ser. No. 15/652,098, titled "SYSTEMS AND METHODS FOR ENABLING TRUSTED COMMUNICATIONS BETWEEN CONTROLLERS," U.S. application Ser. No. 15/652,108, titled "SYSTEMS AND METHODS FOR MITIGATING AND/OR PREVENTING DISTRIBUTED DENIAL-OF-SERVICE ATTACKS," and U.S. application Ser. No. 15/652,114, titled "SYSTEMS AND METHODS FOR VERIFYING A ROUTE TAKEN BY A COMMUNICATION," each of which filed on Jul. 17, 2017. The disclosures of the above applications are hereby incorporated by reference in their entirety for all purposes.

TECHNICAL FIELD

The present disclosure relates to computer systems and methods for replicating a portion of a data set to a local repository. In particular, the present disclosure pertains to computer systems and methods for replicating a portion of a data set to a local repository associated with a subnetwork, the data set being stored on a central repository and associated with one or more subnetworks and the portion of the data set being associated with the subnetwork.

BACKGROUND

A distributed database is a database in which portions of the database are stored in multiple physical locations and processing is distributed among multiple database nodes to provide increased availability and performance. To ensure that the multiple database nodes remain current, a replication process may be employed. A replication process may involve, for example, detecting changes in the database nodes and updating each database node such that all of the database nodes become identical to each other. However, such a process is time and resource intensive process. Further, such a process may not be feasible for systems such as internet-of-things (IoT) systems that may include data for billions of nodes.

SUMMARY

Computer systems and methods for replicating a portion of a data set to a local repository are disclosed. In particular, computer systems and methods for replicating a portion of a data set to a local repository associated with a subnetwork are disclosed. The data set may be stored on a central repository and associated with one or more subnetworks. Further, the portion of the data set being associated with the subnetwork.

In one embodiment, a method for a device associated with a subnetwork may include obtaining a portion of a data set from a central repository. The data set may be associated with one or more subnetworks, and the portion of the data set may be associated with the subnetwork. The method may further include obtaining a request for data originating from a node in the subnetwork. The requested data may include at least one of (i) the portion of the data set, and (ii) data generated based on the portion of the data set, and the request may be destined for the central repository. In addition, the method may include determining whether the central repository is unavailable to provide the requested data, and providing the requested data to the node after the central repository is determined as being unavailable.

In another embodiment, a device associated with a subnetwork may include one or more processors configured to obtain a portion of a data set from a central repository. The data set may be associated with one or more subnetworks, and the portion of the data set may be associated with the subnetwork. The one or more processors may be further configured to obtain a request for data originating from a node in the subnetwork. The requested data may include at least one of (i) the portion of the data set, and (ii) data generated based on the portion of the data set, and the request may be destined for the central repository. In addition, The one or more processors may be configured determine whether the central repository is unavailable to provide the requested data, and provide the requested data to the node after the central repository is determined as being unavailable.

In yet another embodiment, a non-transitory computer-readable storage medium storing instructions that when executed by a computer cause the computer to perform a method for a device associated with a subnetwork. The method may include obtaining a portion of a data set from a central repository. The data set may be associated with one or more subnetworks, and the portion of the data set may be associated with the subnetwork. The method may further include obtaining a request for data originating from a node in the subnetwork. The requested data may include at least one of (i) the portion of the data set, and (ii) data generated based on the portion of the data set, and the request may be destined for the central repository. In addition, the method may include determining whether the central repository is unavailable to provide the requested data, and providing the requested data to the node after the central repository is determined as being unavailable.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Overview

Aspects of the present disclosure pertains to computer systems and methods for replicating a portion of a data set to a local repository. In particular, the present disclosure pertains to computer systems and methods for replicating a portion of a data set to a local repository associated with a subnetwork, the data set being stored on a central repository and associated with one or more subnetworks, and the portion of the data set being associated with the subnetwork.

In some embodiments, the replicated portion of the data set on the local repository associated with the subnetwork may be provided to nodes in the same subnetwork, for example, when the nodes request the portion of the data set from the central repository. In one example, when a node associated with the subnetwork requests the portion of the data set from the central repository, the local repository may intercept the request and provide the replicated portion of the data set on the local repository.

In some embodiments, data generated based on the replicated portion of the data set (i.e., derived data) may be provided to nodes associated with the same subnetwork, for example, when the nodes request data generated based on the portion of the data set stored on the central repository. For example, when derived data is requested by a node on the subnetwork, the local repository may intercept the request, generate the requested data based on the replicated portion of the data on the local repository, and provide the generated data to the node.

Examples of Operating Environments

Figure 1:
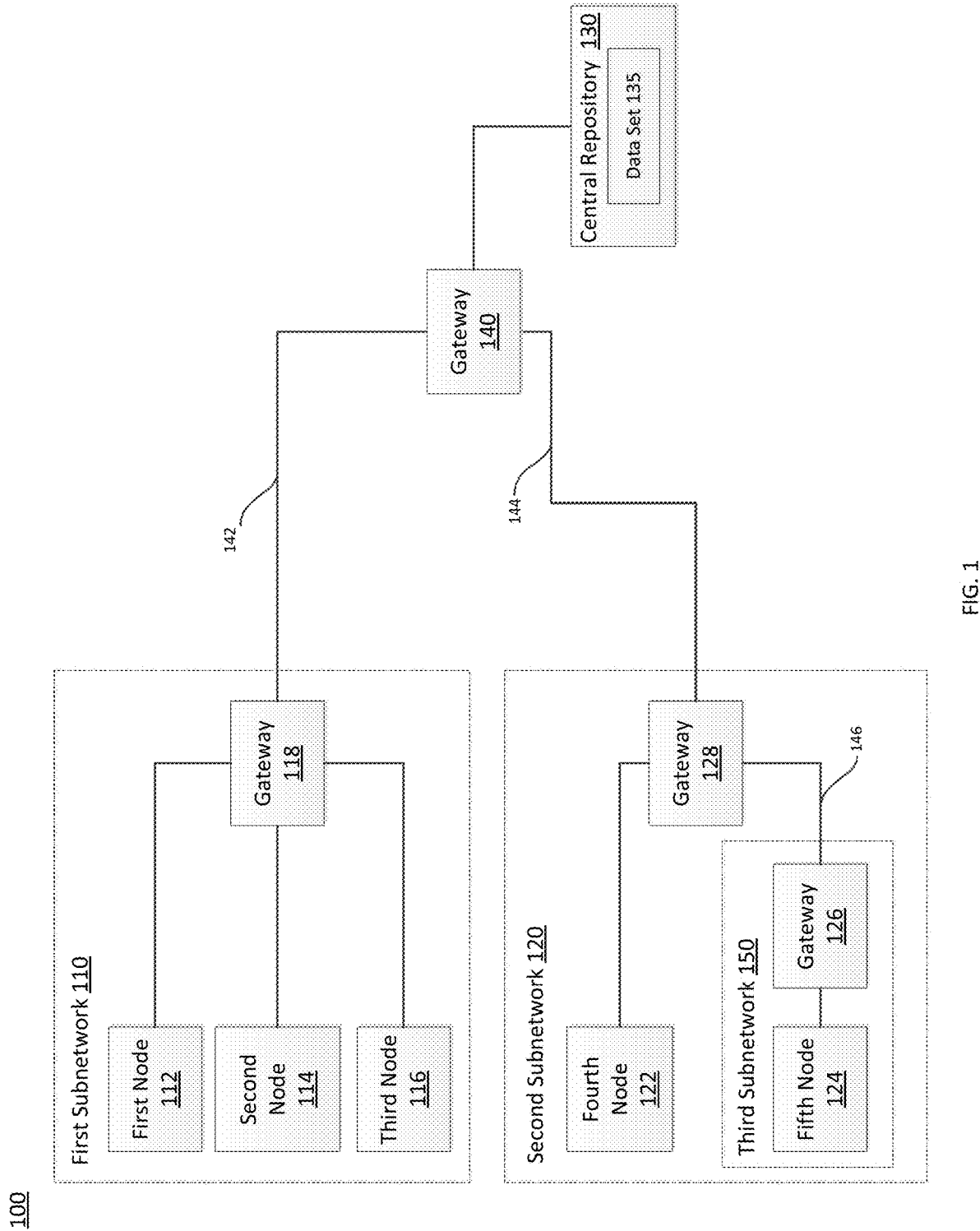
FIG. 1 illustrates an example of a system in accordance with the disclosed embodiments.

FIG. 1 illustrates an example of a system 100 in which concepts consistent with the principles of the invention may be implemented. System 100 includes a first subnetwork 110, a second subnetwork 120, a central repository 130, and a gateway 140. As shown in FIG. 1, first subnetwork 110, second subnetwork 120, and central repository 130 are connected to central repository 130 via gateway 140 and network links (e.g., network link 142 and network link 144).

First subnetwork 110 may include a first node 112, a second node 114, and a third node 116. First subnetwork 110 may further include a gateway 118 connecting first node 112, second node 114, and third node 116 to each other and to gateway 140. Second subnetwork 120 may include a fourth node 122, a third subnetwork 150, and a gateway 128. Gateway 128 may connect fourth node 122 and third subnetwork 150 to each other and to gateway 140. Third subnetwork 150 may include a fifth node 124 and a gateway 126 that connects fifth node 124 to gateway 128 (e.g., using a network link 146).

As used herein, a "node" may be any physical or virtual entity capable of communicating via a computer network. For example, a node may be a physical computer, piece(s) of software, internet-of-things device, internet-of-things hub/bridge, virtual machine, server, printer, gateway, router, switch, smartphone/cellular phone, smart watch, tablet, or combination thereof. In some embodiments, a plurality of nodes may be implemented on a single physical or virtual device. Alternatively, or additionally, a single node may be implemented on a plurality of physical and/or virtual devices. In system 100, gateway 118, gateway 126, gateway 128, gateway 140, and central repository 130 may also be considered "nodes."

As used herein, a "subnetwork" may be any logical grouping of nodes in a network. For example, a subnetwork may include nodes that are grouped based on the nodes' type, geographical location, ownership, performance, cost (e.g., cost of ownership/use), and/or whether the nodes implement certain communication protocols/standards. In another example, a subnetwork may include nodes designated by a system administrator of system 100. In yet another example, a subnetwork may include nodes selected by an algorithm. In some embodiments, a single node may be associated with a plurality of subnetworks. In some embodiments, a subnetwork may be a part of another subnetwork. In some embodiments, nodes in a subnetwork may communicate with each other using a first communication protocol and/or standard (e.g., Ethernet), and nodes in another subnetwork may communicate with each other using a second communication protocol and/or standard (e.g., Fiber-optic Communications). In these embodiments, nodes in the two subnetworks may communicate with each other via one or more gateways. The gateways, as a collective, may be capable of communicating using at least the first and second communication protocols and/or standards. As used herein, a "gateway" may be a node that connects nodes on a subnetwork to a node outside the subnetwork.

As used herein, a "network link" may be any communication component(s) enabling at least one node to communicate with at least one other node. In some embodiments, a network link may include any wired or wireless communication medium that can be used by one or more nodes for communication. Alternatively, or additionally, a network link may include a receiver and/or transmitter that receives and/or transmits data over a wired and/or wireless communication medium. In one example, a network link may be a wireless receiver and/or transmitter. In another example, a network link may be a Ethernet cable connecting two nodes. In this example, the network link may further include Ethernet modules that enables nodes to communicate over the Ethernet cable. In yet another example, a network link may include wireless transceivers.

As shown in FIG. 1, central repository 130 may have access to at least one data set 135. As used herein a "data set" may be any collection of data. In some embodiments, a data set 135 may be a collection of data for a particular system or application. For example, a data set 135 may include a collection of identity data (e.g., public keys associated with nodes and/or users) used for an authentication subsystem of system 100. In another example, a data set 135 may include a collection of blacklists and whitelists (e.g., identifying nodes that are prohibited/allowed to communicate) used for a distributed denial-of-service (DDOS) attack prevention subsystem of system 100. In some embodiments, at least a portion of data set 135 may be stored on central repository 130. Alternatively, or additionally, at least a portion of data set 135 may be stored on a data store external to, and accessible by, central repository 130.

In system 100, central repository 130 may provide portions of data set 135 to various nodes. For example, central repository 130 may obtain a portion of data set 135 and provide the obtained portion of data set 135 to first node 112 via gateway 140 and gateway 118. Alternatively, or additionally, central repository 130 may generate new data based on portions of data set 135, and provide the generated, new data to various nodes. For example, central repository 130 may obtain a portion of data set 135, generate new data based on the portion of data set 135, and provide the generated data to fifth node 124 via gateway 140, gateway 128, and gateway 126. The nodes may use the obtained portions of data set 135 to perform at least some of their intended functions. For example, the nodes may use the portions of data set 135 including identity data to authenticate nodes and/or users. In another example, the nodes may use the portions of data set 135 including blacklists and whitelists to implement a network filter for preventing and mitigating a DDOS attack.

In some embodiments, central repository 130 may provide data to a node by transmitting the data. Alternatively, or additionally, central repository 130 may provide data to a node by making the data available for retrieval (e.g., stored in a data store accessible by the node). Correspondingly, a node may obtain the data provided by central repository 130 by receiving the transmitted data and/or retrieving the data made available for retrieval.

As described above, central repository 130 may also be considered a node. Thus, central repository 130 may be, for example, a physical and/or software executing on a personal computer, an internet-of-things device/hub, virtual machine, server, printer, gateway, router, switch, smartphone/cellular phone, smart watch, or tablet. For example, in in some embodiments, central repository 130 may be implemented on gateway 140. In some embodiments, central repository 130 may include one or more database servers. In some embodiments, at least some functions of central repository 130 may be implemented on a cloud platform, such as Amazon Web Services (AWS), Google Cloud, and Microsoft Azure.

In some embodiments, central repository 130 may include a server and a data store. In these embodiments, the server may obtain data from the data store and provide the obtained data to various nodes. Alternatively, or additionally, the server may obtain data from the data store, generate new data based on the obtained data, and provide the generated data to various nodes.

Figure 2:
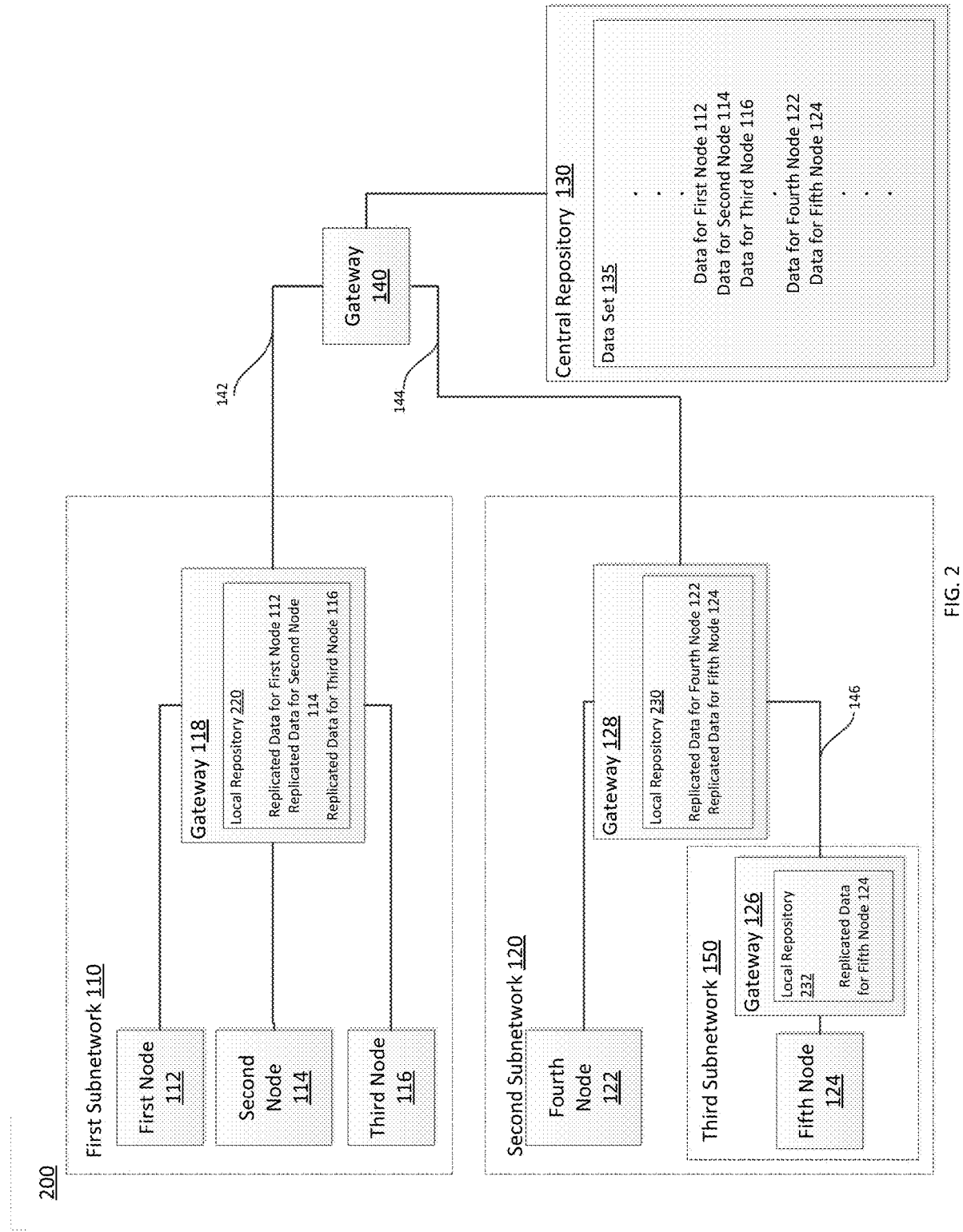
FIG. 2 illustrates another example of a system in accordance with the disclosed embodiments.

FIG. 2 illustrates another example of system 200 in accordance with the disclosed embodiments. System 200 is similar to system 100 of FIG. 1, except that FIG. 2 further illustrates data accessible by various nodes in system 200. For example, in system 200, data set 135 of central repository 130 is shown to include data for various nodes in system 200. In particular, data set 135 may include, for example, data for first node 112, data for second node 114, data for third node 116, data for fourth node 122, and data for fifth node 124. Although not illustrated in FIG. 2, in some embodiments, data set 135 may include data for a plurality of nodes. For example, data set 135 may include data that is intended to be used by two or more nodes in system 200.

As used herein, the phrase "data for a node" may refer to any data that may be used by the node. For example, first node 112 may obtain data for first node 112, and first node 112 may perform an action based on the obtained data for first node 112. Alternatively, or additionally, the phrase "data for a node" may refer to any data that may be used to generate new data that may be used by the node. For example, a node (e.g., central repository 130) may generate new data from data for first node 112, and first node 112 may obtain the generated data and perform an action based on the obtained data.

In some situations, however, central repository 130 may be unavailable for some of the nodes in system 200 to access. More particularly, central repository 130 may be inaccessible and/or undesirable to be accessed by one or more nodes in system 200. For example, network link 142 may experience an outage during a scheduled maintenance of network equipment. In another example, network link 144 may be a satellite communication link that may be expensive to use during peak hours. In yet another example, network link 146 may be a wireless network link connecting a portable device (e.g., fifth node 124 and gateway 126) located underground tunnel to gateway 128. Further, central repository 130 may cease to operate, for example, due to a malicious attack (e.g., distributed denial-of-service attack) or other technical issues. Consequently, in these situations, nodes that require the data from data set 135, or data generated based on data from data set 135, may not be able to perform their intended functions unless an alternative data source for such data is available to them.

To that end, in system 200, data set 135 on central repository 130 may be replicated to local repositories (e.g., local repository 220, local repository 230, and local repository 232) when central repository 130 is available to be accessed by the local repositories (e.g., during off peak hours or when central repository 130 is operating normally). Further, the local repositories may be configured to perform at least some of the functions of central repository 130 for the nodes in the same subnetwork using the replicated version of data set 135 stored locally. In one example, during normal operation, data on central repository 130 may be replicated local repository 220 on gateway 118. After central repository 130 become unavailable, local repository 220 may provide first node 112, second node 114, and third node 116 with the replicated data stored in local repository 220. Alternatively, or additionally, after central repository 130 becomes unavailable, local repository 220 may generate new data based on local repository 220's replicated data and provide the newly generate data to first node 112, second node 114, and third node 116. The process used by local repository 220 to generate the new data may be the same, or substantially the same, as the process that would have been used by central repository 130 to generate the new data based on central repository 130's data. Further, similar to central repository 130, a local repository may store the replicated data internally or on a data store accessible by the local repository.

However, replicating the entire data set 135 to multiple local repositories is resource intensive and time consuming. Moreover, in systems such as internet-of-things systems where data set 135 may include data for billions of nodes, replication of data set 135 to multiple local repositories may not be technically and/or economically feasible.

Accordingly, in system 200, portions of data set 135 are selectively replicated to various local repositories. In particular, in some embodiments, a portion of data set 135 that is associated with a subnetwork may be replicated to a local repository associated with the same subnetwork. For example, as shown in FIG. 2, a portion of data set 135 associated with first subnetwork 110 (i.e., data for first node 112, data for second node 114, and data for third node 116) may be selectively replicated local repository 220 on gateway 118. Similarly, a portion of data set 135 associated with second subnetwork 120 may be selectively replicated to local repository 230 on gateway 128, and a portion of data set 135 associated with third subnetwork 150 may be selectively replicated to local repository 232. In these examples, the gateways including the local repositories, or the local repositories themselves, may perform the functions of central repository 130 using the replicated data stored in the local repositories, for example, after determining that central repository 130 is unavailable. Thus, nodes with access to the local repositories may continue operating as if central repository 130 is continuously available to the nodes. In some embodiments, central repository 130 may initiate the process to replicate the portions of data set 135 to the local repositories. That is, the portions of data set 135 are "pushed" to the local repositories.

In some embodiments, central repository 130 may dynamically assign nodes (including gateways) to subnetworks. For example, central repository 130 may dynamically assign nodes and gateways to a particular subnetwork based on a current network map of system, changing performance requirements of various nodes, changing availability of various network links, and/or other non-technical factors. Thus, in these embodiments, the portion of data set 135 associated with a subnetwork may change during operation. For example, a new node may be added to a subnetwork, requiring additional data to be included in the portion of data set 135 and replicated to the local repository associated with the subnetwork. In another example, a node may be moved to another subnetwork, requiring data associated with the moved node to be replicated to a local repository in a different subnetwork. In yet another example, a new subnetwork may be created, requiring data to be replicated to an additional local repository associated with the new subnetwork.

Moreover, data set 135 may be altered by one or more users, administrators, or other nodes. For example, data set 135 may include sensor readings from various nodes, and central repository 130 may receive an updated sensor reading from some of the nodes. In another example, data set 135 may be changed by one or more users via a user interface connected to central repository 130. In yet another example, an administrator may directly modify data set 135 stored on central repository 130.

In system 200, central repository 130 may provide updated portions of data set 135 to various local repositories (e.g., local repositories containing outdated data) after data in data set 135 is altered. In some embodiments, central repository 130 may initiate the process to provide the updated portions of data set 135 to the local repositories. That is, central repository 130 "push" the updated portions of data set 135 to local repositories.

In some embodiments, portions of data set 135 may be provided to local repositories using one or more trusted communications. As used herein, a trusted communication is a communication where the recipient may verify the identity of the sender. For example, in system 200, a portion of data set 135 may be signed (i.e., generate a signatures) using one or more private keys, and the generated signature may be provided to the local repository. The local repository, prior to accepting the provided portion of data set 135, may verify the signature using one or more corresponding public keys. In some embodiments, portions of data set 135 may be provided to local repositories using encrypted communications.

In some embodiments, a local repository associated with a subnetwork, or a node that includes the local repository, may intercept requests for data that are destined for central repository 130 and originating from nodes in the same subnetwork. Further, in response to the request, the local repository or the node that includes the local repository may provide the requested data using the replicated data stored on the local repository. As an example, in system 200, first node 112 may transmit a request for data for first node 112 destined for central repository 130. In situations where central repository 130 is available, central repository 130 may receive the request, and provide the requested data (i.e., data for first node 112 stored on central repository 130) to first node 112. However, in situations where central repository 130 is unavailable, gateway 118 may intercept and respond to the request by providing the requested data to first node 112 using the replicated data for first node 112 stored on local repository 220.

In some embodiments, local repositories may provide the requested data to the nodes such that the nodes may process the data in the same, or substantially the same, manner as the data that was provided by central repository 130. For example, the data provided by local repositories may be indistinguishable from the data provided by central repository 130. In another example, the data provided by the local repositories may be in the same format, or in a substantially the same format, as the data provided by central repository 130. In yet another example, the data provided by local repositories may be signed using a private key associated with central repository 130. For example, the data provided by local repositories may be signed using a private key shared with central repository 130 or derived from a private key accessible by central repository 130. In some embodiments, local repositories, after determining that central repository 130 is unavailable, may prevent the request from reaching central repository 130.

In some embodiments, local repositories may be implemented on a plurality of nodes. For example, local repositories may be implemented on a plurality of gateway devices on the same subnetwork. In these embodiments, each node in the plurality of nodes may have its own copy of the replicated portion of data set 135. Alternatively, the replicated portion of data set 135 may be distributed among the plurality of nodes. In some embodiments, local repositories may be implemented on edge nodes (e.g., first node 112, second node 114, and third node 116).

Local repositories may determine the availability of central repository 130 in numerous way. In some embodiments, a network policy may define conditions in which central repository 130 is to be considered as being available or unavailable. The conditions may include, for example, time/date at which central repository 130 may be available. In some embodiments, central repository 130 may provide local repositories with communications indicating that central repository 130 is available or unavailable. A local repository may determine that central repository 130 is available or unavailable if such a communication was received within a predetermined amount of period. Alternatively, or additionally, a local repository may determine the availability of central repository 130 by providing a status request to central repository 130. In response, central repository 130 may provide the node with the status. The node may determine that central repository 130 is unavailable in the absence of a response from central repository 130.

Although in system 200, local repositories are shown to be accessible by, and/or included in gateways, a local repository associated with a subnetwork may be made accessible and/or included in any node that can be accessed by nodes in the same subnetwork. For example, in system 200, local repository 220 may be made accessible and/or included in third node 116. In another example, local repository 232 may be made accessible and/or included in fourth node 122. In yet another example, a local repository may also be accessible by, and/or included in, gateway 140. Such a local repository may store, for example, data for nodes in first subnetwork 110, second subnetwork 120, and third subnetwork 150. In some embodiments, as shown in FIG. 2, a portion of data set 135 may be stored in multiple local repositories. For example, in system 200, replicated data for fifth node 124 may be included in both local repository 232 and local repository 230. Storing a portion of data set 135 on multiple local repositories may provide additional redundancy, for example, when both central repository 130 and one of the local repository become unavailable.

In addition to enabling data in data set 135 to be provided to nodes even when central repository 130 is not available, replicating portions of data set 135 to local repositories may provide numerous benefits for various types of systems. In one example, performance of a node may be improved because data needed by the node may be obtained from a local repository which may be accessed with less latency. To that end, performance may be further improved by including a local repository close to an edge node (e.g., at a local gateway) and/or in the edge node itself. In another example, cost of operating system 200 may be reduced because data needed by a node may be obtained from a local repository which may incur less cost (e.g., when global network links such as network link 142 are charged usage fee) than obtaining the data from central repository 130. Moreover, the reduced data traffic to and from central repository 130 may enable system 200 to handle additional number of nodes.

Figure 3:
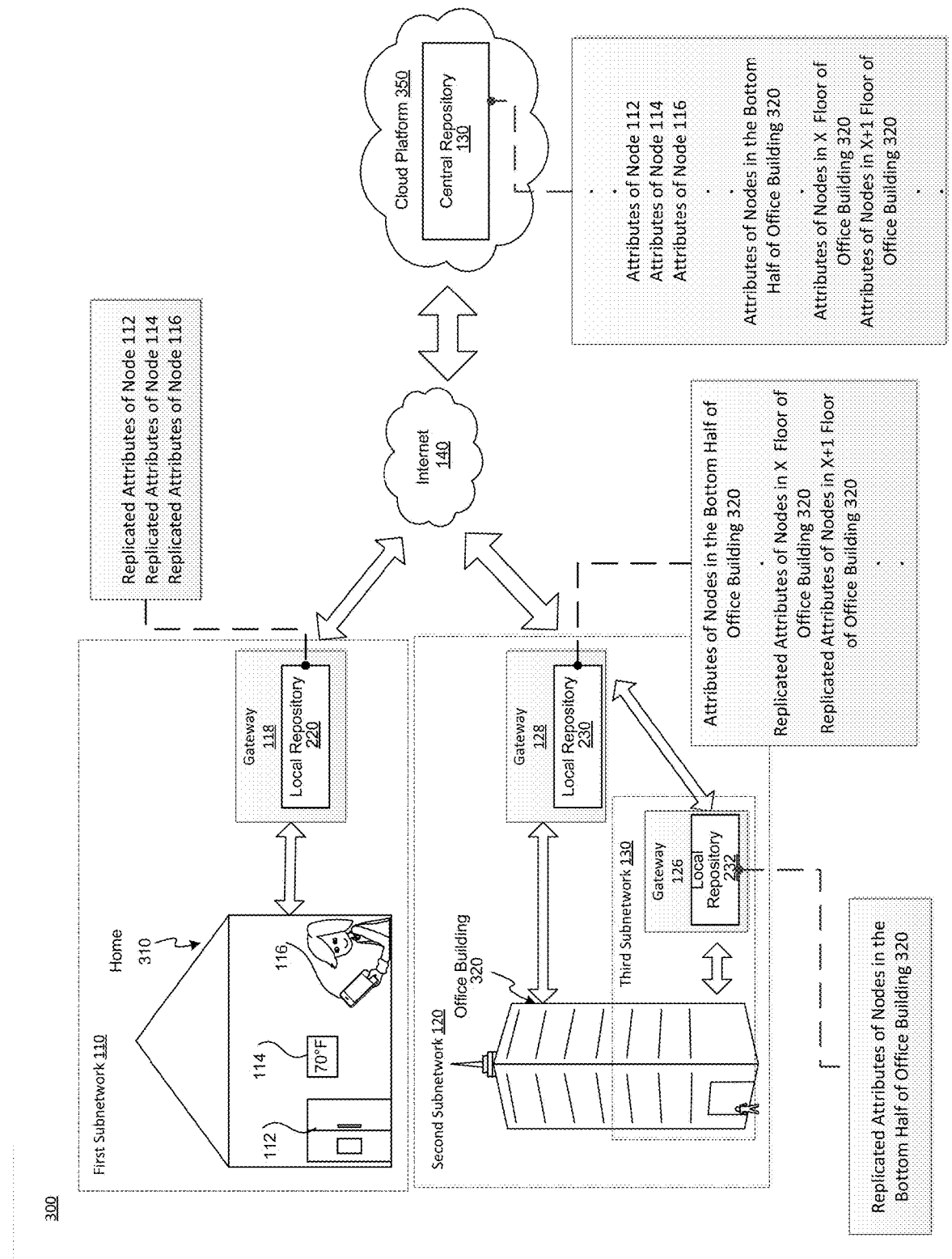
FIG. 3 illustrates an example of a system deployed in an internet-of-things (IoT) system in accordance with the disclosed embodiments.

FIG. 3 illustrates an example of a system 300 in accordance with the disclosed embodiments. System 300 is similar to systems 100 and 200 of FIGS. 1 and 2, except system 300 is deployed as an Internet-of-Things (IoT) system. As shown in FIG. 3, first subnetwork 110 includes all nodes in a home 310 and gateway 118. In home 310, first node 112 may be a smart refrigerator, second node 114 may be a smart thermometer, and third node 116 may be a smartphone. Gateway 118 may be located near or inside home 310. For example, gateway 118 may be a personal Wi-Fi hotspot installed in home 310. FIG. 3 further illustrates second subnetwork 120 that includes all nodes in an office building 320, gateway 128, and gateway 126. Nodes in office building 320 may include, for example, phone, printers, scanners, fax machine, computers, routers, switches, servers, and smartphones. In system 300, third subnetwork 150 is a part of second subnetwork 120. Third subnetwork 130 may include all devices in a portion of office building 320 (e.g., bottom half of office building 320 or floors that include data centers) and gateway 126. Gateways 128 and 126 may be near or inside office building 320. As shown in FIG. 3, communications originating from nodes in home 310 and destined for central repository 130 may be routed via gateway 118. Similarly, communications originating from nodes in office building 320 and destined for central repository 130 may be routed via gateway 128.

In system 300, nodes may request various types of data from central repository 130, and the requested data may be required by the nodes to perform at least some of their intended functions. In the example of FIG. 3, such data may include attributes of various nodes in system 300. Attributes may include, for example, capabilities of various nodes, such as whether a node has a certain type of sensor, and/or implements a protocol. In another example, attributes may include last-known status of various nodes (e.g., last sensor reading by a node, whether a node is active, and/or the last-known user of a node). In yet another example, attributes may include identifier(s) associated with a node, such as the node's IP address or MAC address.

In these embodiments, attributes of the nodes in a subnetwork (stored on central repository 130) may be selectively replicated to a local repository in the same subnetwork. As shown in FIG. 3, for example, attributes of first node 112, second node 114, and third node 116 may be replicated to local repository 220 in gateway 118. Similarly, attributes for all nodes in office building 320 may be replicated to local repository 230, and attributes for nodes in bottom half of office building 320 may be replicated to local repository 232. In some embodiments, local repository 230 may not store attributes for nodes in the bottom half of office building 320 to avoid redundancy. Accordingly, even when central repository 130 is unavailable to the nodes in a subnetwork, the nodes may still request attributes of the nodes in the same subnetwork from central repository 130, and subsequently receive the requested data from the local repository in the same subnetwork.

In some embodiments, a node may request data generated based on the data stored in central repository 130, and after determining that central repository 130 is unavailable, a local repository may intercept the request, generate the requested data based on the replicated data stored in the local repository, and provide the generated data to the node. In one example, a computer in office building 320 may request a list of printers with a particular set of attributes. In this example, if central repository 130 is unavailable, gateway 128 or local repository 230 may perform a query on the replicated data stored on local repository 230 to generate the requested list and provide the generated list to the requesting computer.

In system 300, an administrator may add, change, or remove attributes for nodes in system 300 by changing the data stored on central repository 130. For example, an interface may be available to provide an administer with options to add, change, or remove the attribute data on central repository 130. In some embodiments, the attributes may change in response to changes alteration of a node's configuration and removal/addition of a node. For example, a node's network configuration may change causing the node's IP address to change. In another example, a new node may be added or an existing node may be removed, requiring the attributes for the node to be added or removed.

After the attribute data on central repository 130 is altered, the changes may be propagated to the local repositories. For example, if attributes for one of the nodes in the bottom half of office building 320 is changed, central repository 130 may initiate a process to replicate the updated attributes to both local repository 230 and local repository 232.

Figure 4:
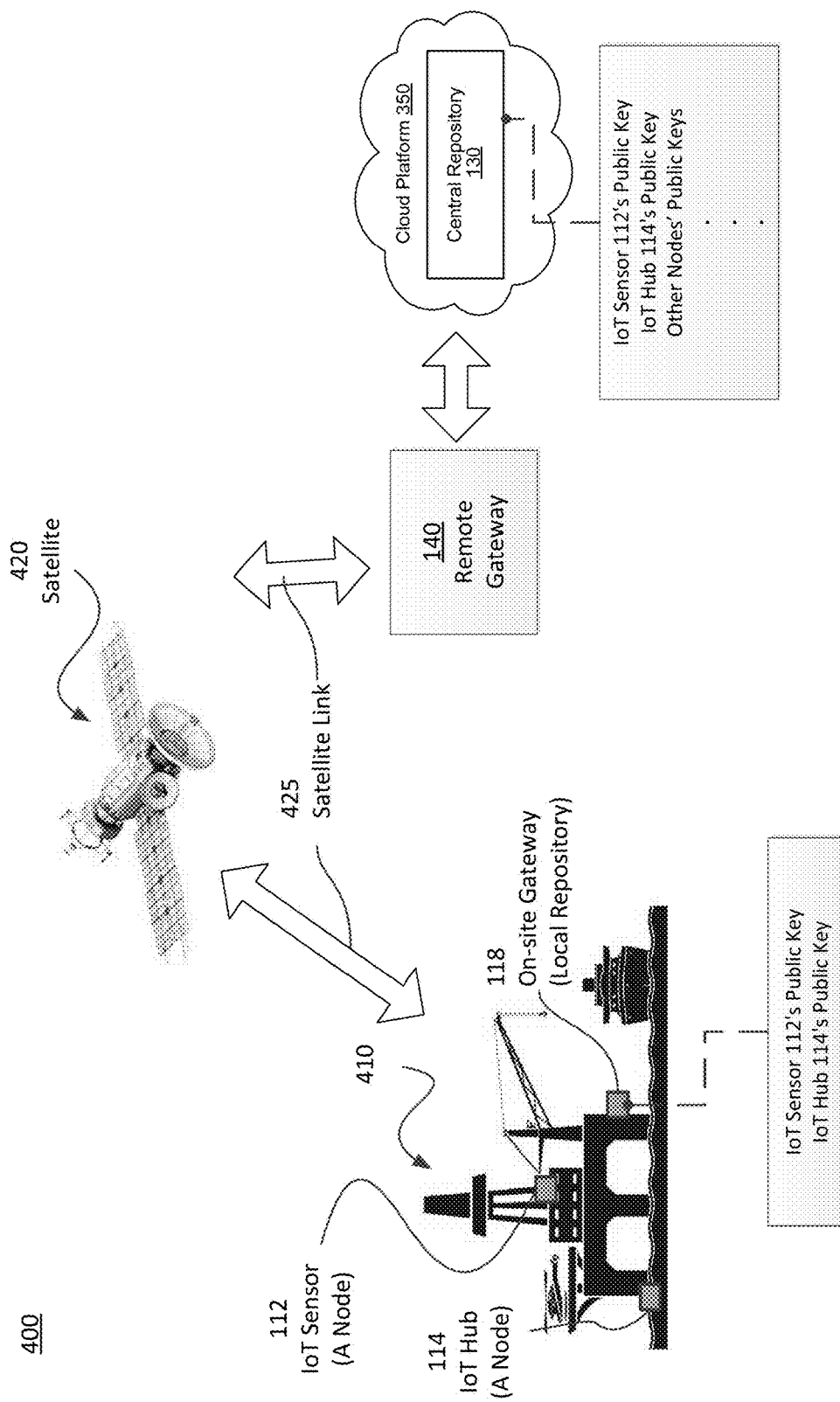
FIG. 4 illustrates an example of a system deployed in an oil rig in accordance with the disclosed embodiments.

FIG. 4 illustrates an example of a system 400 in accordance with the disclosed embodiments. System 400 is similar to systems 100 and 200 of FIGS. 1 and 2, except parts of system 400 are deployed on an oil rig 410.

As shown in FIG. 4, in system 400, first node 112 may be an internet-of-things (IoT) sensor and second node 114 may be an IoT hub for obtaining and processing the sensor readings from IoT sensor 112. Both IoT sensor 112 and IoT hub 114 may connected to an on-site gateway 118. Further, gateway 118 may be connected to a remote gateway 140 and a cloud platform 130 via a satellite 420 and satellite links 425. Although not shown in FIG. 4, system 400 may further include tens of thousands of nodes (e.g., additional IoT sensors and hubs), some of which may be deployed on another oil rig and some of which may be deployed on oil rig 410. In other words, central repository 130 contain data for tens of thousands of nodes.

In the example of FIG. 4, IoT sensor 112 may provide sensor readings to IoT hub 114 (e.g., by including the sensor readings in a communication destined for IoT hub 114). Further, to enable IoT hub 114 to verify that the sensor readings are indeed from IoT sensor 112, IoT sensor 112 may generate a signature based on the sensor readings using IoT sensor 112's private key and send the signature to IoT hub 114 along with the sensor readings.

In system 400, verifying that the sensor readings are indeed from an authorized sensor (i.e., IoT sensor 112) may enable system 400 to prevent and/or mitigate malicious attacks on system 400 such as an attack spoofing IoT sensor 112 in an attempt to inject false sensor readings to system 400. After receiving the sensor readings and the signature, IoT hub 114 may attempt to verify IoT sensor 112's signature before processing the received sensor readings.

In some embodiments, IoT hub 114 may verify IoT sensor 112's signature by obtaining and using IoT sensor 112's public key. In the example of FIG. 4, public keys associated with the nodes in system 400 are centrally stored on central repository 130. As discussed above, system 400 may include tens of thousands of nodes, and thus, storing copies of all public keys locally (e.g., on each of the nodes or gateways) may not be feasible technically or economically. Thus, if central repository 130 is available, IoT hub 114 may request and obtain IoT sensor 112's public key from central repository 130.

However, in system 400, oil rig 410 may not have a continuous connection to central repository 130. For example, satellite links 425 may not be available during storm or cloudy days. Consequently, in these situations, IoT hub 114 may not be to verify that the sensors readings are indeed from IoT sensor 112 unless an alternative data source for the public keys is available to IoT hub 114. To that end, in system 400, a subset of the public keys stored on central repository 130 may be replicated to local repositories (e.g., on-site gateway 118). Further, the local repositories may intercept the request for the public keys destined for central repository 130 and provide the requested public keys to IoT hub 114.

Alternatively, or additionally, in some embodiments, IoT hub 114 may verify IoT sensor's signature by requesting another node (e.g., central repository 130) to verify the signature. For example, IoT hub 114 may attempt to provide the obtained sensor readings and IoT device 112's signature to central repository 130. If central repository 130 is available, central repository 130 may verify the signature using IoT sensor 112's public key stored on central repository 130 and respond to IoT hub 114 with a communication indicative of whether the signature is valid or not. If central repository 130 is unavailable, on-site gateway 118 may intercept the sensor readings and IoT sensor 112's signature, verify the IoT sensor 112's signature using replicated version of IoT sensor 112's public key, and respond to IoT hub 114 with a communication indicative of whether the signature is valid or not. Thus, even when central repository 130 is unavailable, trusted communications between the nodes in oil rig 410 may be possible.

An Example of a Process

Figure 5:
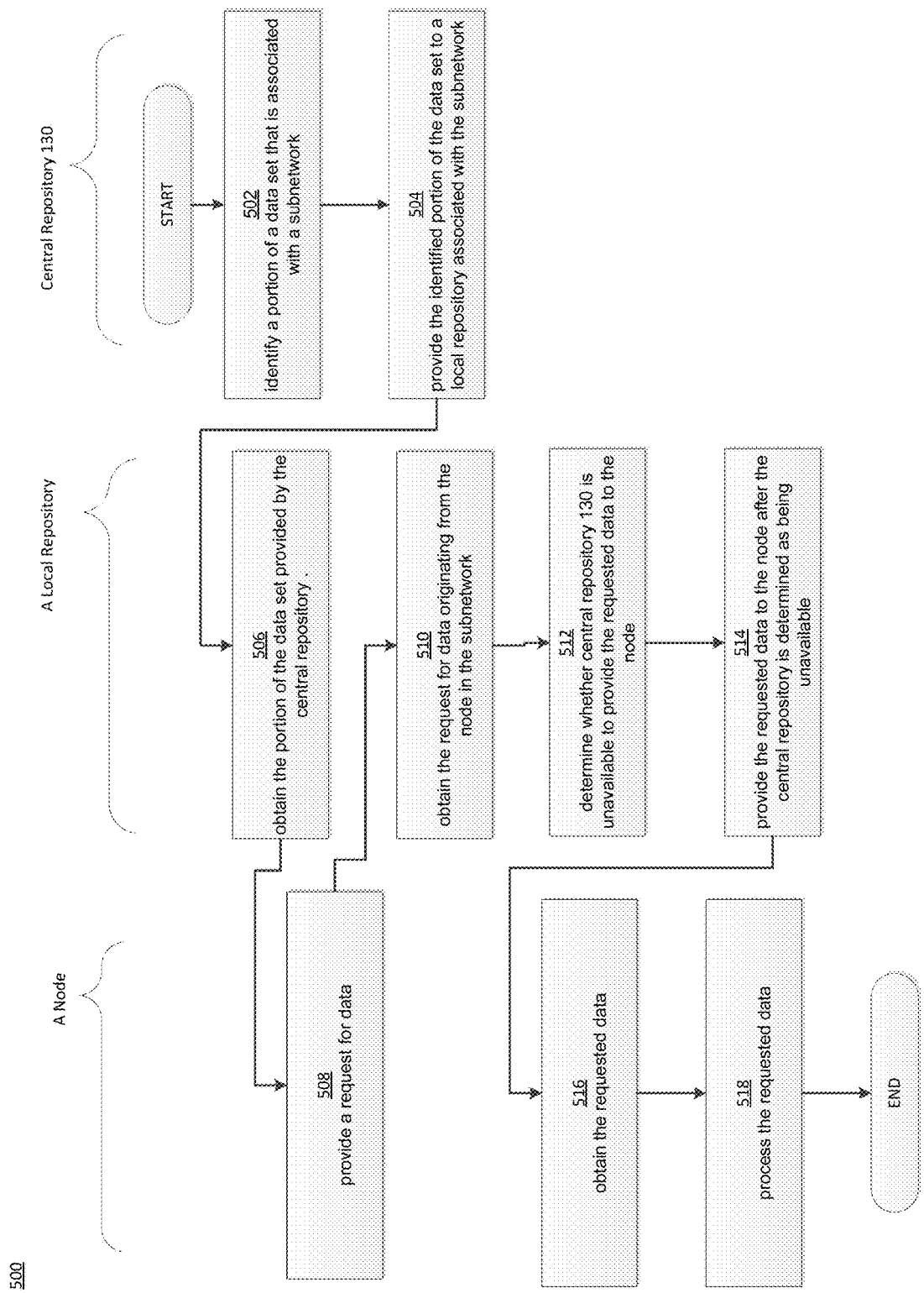
FIG. 5 illustrates a process in accordance with the disclosed embodiments.

FIG. 5 illustrates a process 500 in accordance with the disclosed embodiments.

At a step 502, central repository 130 may identify a portion of a data set 135 that is associated with a subnetwork. In one example, data set 135 may include data for nodes that are in one or more subnetworks, and the portion of data set 135 may include data for nodes that are in the subnetwork of the one or more subnetworks. In another example, data set 135 may include data for nodes that are in a plurality of subnetworks, and the portion of data set 135 may include data for nodes that are in the subnetwork of the plurality of subnetworks.

At a step 504, central repository 130 may provide the identified portion of the data set 135 to a local repository associated with the subnetwork. In some embodiments, central repository 130 may initiate a process to replicate the identified portion of data set 135 to a local repository associated with the subnetwork. The local repository associated with the subnetwork may include, for example, a gateway connected to at least one node in the subnetwork. Alternatively, the local repository may be implemented on an edge node in the subnetwork.

At an optional step, central repository 130 may provide updates to the identified portion of the data set 135. For example, after the portion of the data set 135 is altered on central repository 130, central repository 130 may initiate a process to provide the updated portion of the data set 135 to the local repository.

At a step 506, the local repository may obtain the portion of the data set 135 provided by central repository 130. In some embodiments, the local repository may store the obtained portion of the data set 135 on a data store within the local repository and/or on a data store accessible by the local repository.

At an optional step, the local repository may obtain the updates to the identified portion of the data set 135. After obtaining the updates, the local repository may apply the updates to the portion of the data set 135 on the local repository.

At a step 508, a node in the subnetwork may provide a request for data. The request may originate from the node in the subnetwork, and the requested data may include at least one of (i) the portion of the data set 135, and (ii) data generated based on the portion of the data set 135. Further, the request may be destined for the central repository 130.

At a step 510, the local repository may obtain the request for data originating from the node in the subnetwork. For example, the local repository may intercept the request for data destined for central repository 130. In some embodiments, the local repository may prevent the request from reaching central repository 130.

At a step 512, the local repository may determine whether central repository 130 is unavailable to provide the requested data to the node. As discussed above, a local repository may determine the availability of central repository 130 in numerous ways. In some embodiments, a network policy may define conditions in which central repository 130 is to be considered as being available or unavailable. In these embodiments, the local repository may access the network policy (e.g., by accessing a policy server). The conditions may include, for example, time/date at which central repository 130 may be available. In some embodiments, as discussed above, central repository 130 may provide local repositories with communications indicating that central repository 130 is available or unavailable. A local repository may determine that central repository 130 is available or unavailable if such a communication was received within a predetermined amount of period. Alternatively, or additionally, a local repository may determine the availability of central repository 130 by providing a status request to central repository 130. In response, central repository 130 may provide the node with the status. The node may determine that central repository 130 is unavailable in the absence of a response from central repository 130.

At a step 514, the local repository may provide the requested data to the node after the central repository is determined as being unavailable. At a step 516 the node may obtain the requested data. At a step 518, the node may process the requested data. In some embodiments, the node may perform an action based on the requested data.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

I claim:

1. A device associated with a subnetwork, the device comprising:
    memory circuitry; and
    one or more processors coupled to the memory circuitry, the one or more processors configured to cause the device to:
    obtain a portion of a data set from a central repository, the data set being associated with one or more subnetworks, and the portion of the data set being associated with the subnetwork, wherein the central repository dynamically assigns one or more nodes to the subnetwork, wherein the portion of the data set includes attributes only of the one or more nodes in the subnetwork, and wherein the obtained portion of the data set is pushed to the device by the central repository during a scheduled time;
    replicate the obtained portion of data set in a local repository included on the device;
    determine that the central repository is unavailable based at least in part on a network policy specifying conditions in which the central repository is to be considered as being available or unavailable;
    in response to determining that the central repository is unavailable, intercept a request for data originating from a node in the subnetwork, wherein:
        the requested data includes at least one of (i) the portion of the data set, and (ii) data generated based on the portion of the data set,
        the request is destined for the central repository; and
        the intercepting prevents the request for data from reaching the central repository;
    access the requested data from the local repository; and
    provide the requested data to the node.

2. The device of claim 1, wherein the data set includes public keys associated with nodes in the one or more subnetworks, and the portion of the data set includes a subset of the public keys that are associated with the subnetwork.

3. The device of claim 1, wherein the data set includes attributes of nodes in the one or more subnetworks, and the portion of the data set includes the attributes of a subset of the nodes that are associated with the subnetwork.

4. The device of claim 1, wherein the device is a gateway.

5. The device of claim 1, wherein the one or more processors are further configured to cause the device to obtain an update to the portion of the data set provided by the central repository.

6. The device of claim 5, wherein the providing of the update to the device is initiated by the central repository.

7. The device of claim 1, wherein the one or more processors are further configured to cause the device to provide a digital signature generated at least based on at least a portion of the requested data using a private key associated with the central repository.

8. The device of claim 1, wherein the providing of the requested data includes providing the obtained portion of the data set, and wherein the portion of the data set is obtained from the central repository prior to obtaining the request for data.

9. The device of claim 1, wherein the providing of the requested data includes (i) generating data based on the obtained portion of the data set and (ii) providing the generated data, and wherein the portion of the data set is obtained from the central repository prior to obtaining the request for data.

10. A method for a device associated with a subnetwork, the method comprising:
    obtaining a portion of a data set from a central repository, the data set being associated with one or more subnetworks, and the portion of the data set being associated with the subnetwork, wherein the central repository dynamically assigns one or more nodes to the subnetwork, wherein the portion of the data set includes attributes only of the one or more nodes in the subnetwork, and wherein the obtained portion of the data set is pushed to the device by the central repository during a scheduled time;
    replicating the obtained portion of data set in a local repository included on the device;
    determining that the central repository is unavailable based at least in part on a network policy specifying conditions in which the central repository is to be considered as being available or unavailable;
    in response to determining that the central repository is unavailable, intercepting a request for data originating from a node in the subnetwork, wherein:
        the requested data includes at least one of (i) the portion of the data set, and (ii) data generated based on the portion of the data set,
        the request is destined for the central repository; and
        the intercepting prevents the request for data from reaching the central repository;
    accessing the requested data from the local repository; and
    providing the requested data to the node.

11. The method of claim 10, wherein the data set includes public keys associated with nodes in the one or more subnetworks, and the portion of the data set includes a subset of the public keys that are associated with the subnetwork.

12. The method of claim 10, wherein the data set includes attributes of nodes in the one or more subnetworks, and the portion of the data set includes the attributes of a subset of the nodes that are associated with the subnetwork.

13. The method of claim 10, wherein the device is a gateway.

14. The method of claim 10, further comprising obtaining an update to the portion of the data set provided by the central repository.

15. The method of claim 14, wherein the providing of the update to the device is initiated by the central repository.

16. The method of claim 10, further comprising providing a digital signature generated at least based on at least a portion of the requested data using a private key associated with the central repository.

17. The method of claim 10, wherein the providing of the requested data includes providing the obtained portion of the data set, and wherein the portion of the data set is obtained from the central repository prior to obtaining the request for data.

18. The method of claim 10, wherein the providing of the requested data includes (i) generating data based on the obtained portion of the data set and (ii) providing the generated data, and wherein the portion of the data set is obtained from the central repository prior to obtaining the request for data.

* * * * *